United States Patent [19]

Sawyer

[11] 4,131,136
[45] Dec. 26, 1978

[54] ROLLER GUARD FOR SWIMMING POOL CLEANING HOSES

[76] Inventor: Joseph J. Sawyer, P.O. Box 868, Longwood, Fla. 32750

[21] Appl. No.: 840,772

[22] Filed: Oct. 11, 1977

[51] Int. Cl.² ............................................. F16L 57/00
[52] U.S. Cl. .................................... 138/110; 248/55; 308/207 R
[58] Field of Search ...................... 138/110, 103, 178; 308/207 R, 215, 212, 1 R; 248/55

[56] References Cited
U.S. PATENT DOCUMENTS

| 1,269,924 | 6/1918 | Gathright | 138/110 |
| 1,448,465 | 3/1923 | Sherman | D11/11 |
| 2,706,496 | 4/1955 | Bond | 248/55 |
| 2,816,734 | 12/1957 | Crofoot | 248/55 |

Primary Examiner—Richard E. Aegerter
Assistant Examiner—L. Footland
Attorney, Agent, or Firm—Duckworth, Hobby, Allen & Pettis

[57] ABSTRACT

A guard for swimming pool cleaning hoses includes a spool having a hole therethrough, the hole dimensioned so as to receive the hose. The periphery of the spool is provided with a concavity, with a plurality of individual roller segments rotatably mounted in the cavity about a shaft, whereby the roller segments produce frictional contact between the hose and a pool being cleaned.

2 Claims, 3 Drawing Figures

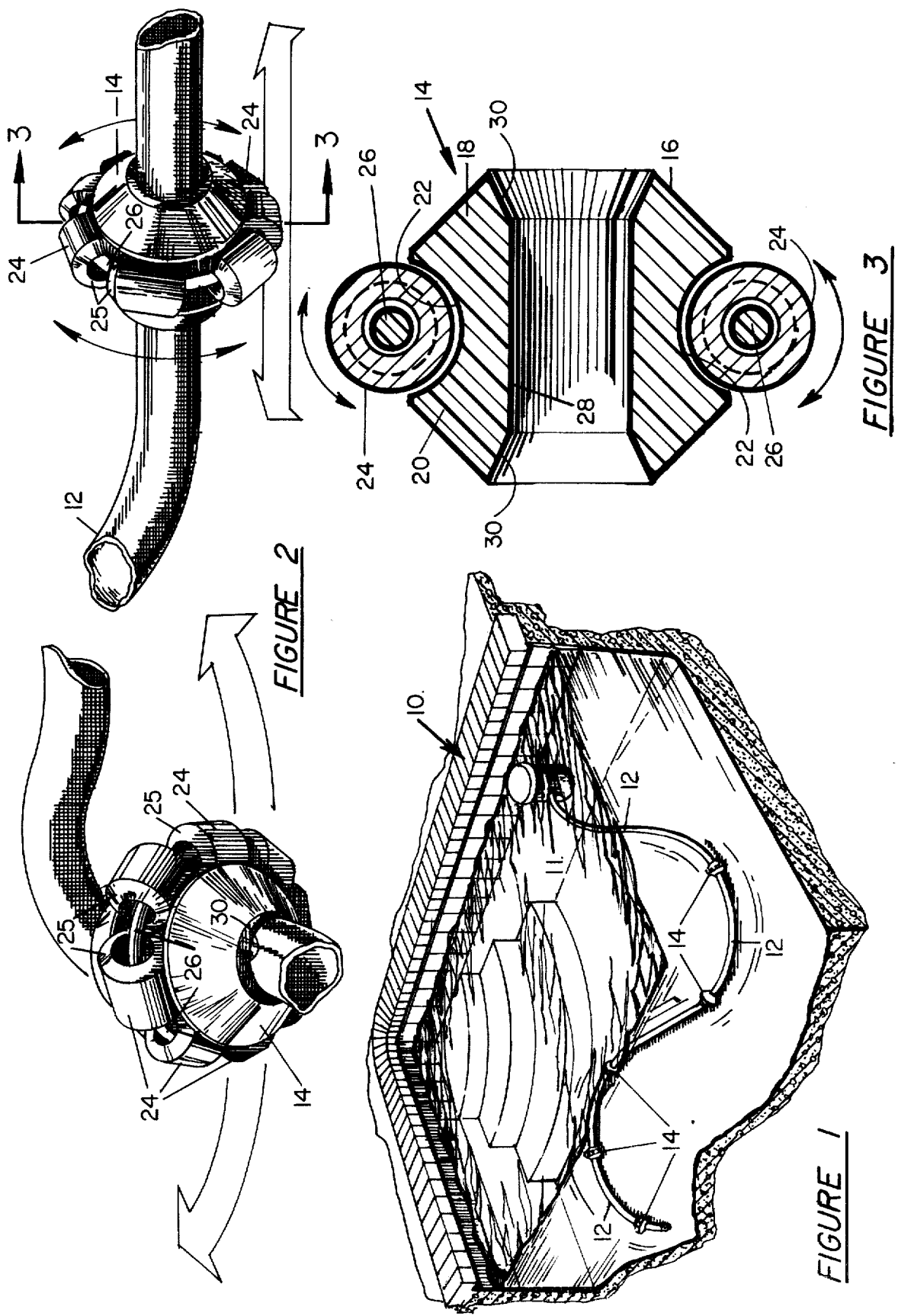

ROLLER GUARD FOR SWIMMING POOL CLEANING HOSES

BACKGROUND OF THE INVENTION

1. Field of the Invention

The present invention relates generally to swimming pool maintenance devices, and more particularly to a protective guard for a type of swimming pool cleaning aid known as a "whip" which is designed to automatically remove scum, sediment and other accumulations of foreign matter from the submerged surfaces of a swimming pool so as to disperse the foreign matter into the pool water for subsequent removal by the normal action of the pool filtering system.

2. Description of the Prior Art

The cleaning of sediment and other foreign matter from the bottom and side walls of swimming pools involves considerable expense, since such cleaning is required at regular intervals and is both laborious and time consumming. The expense and work involved in pool maintenance has, in the past, proven considerably discouraging to prospective purchasers of pool installations. Therefore, pool owners and builders have long recognized the need for pool cleaning aids to reduce the time, labor and expense of such pool maintenance.

In recent years, automatic cleaning aids for swimming pools have been developed in which accumulated scum and dirt are cleaned from the walls of the pool by the action of a high pressure water spray issuing from a discharge nozzle attached to the end of a flexible hose. The flexible hose is submerged in the pool of water and may be supported by a float on the water surface. The passage of water under pressure though the flexible hose and an associated discharge nozzle causes the hose to writhe with a sinuous motion and thereby constantly reposition the high pressure water spray adjacent different portions of the submerged pool surface. As a result, the high pressure water action effectively removes the foreign matter from the surface of the pool, thereby dispersing said foreign matter in the pool water for subsequent removal by the pool's filtering system. Typical examples of such arrangements are disclosed in the following U.S. Pat. Nos.: 3,170,180 to Winston, et al.; 3,032,044 to Pansini; 3,464,068 to Whitaker; 4,007,749 to Pansini; 3,718,148 to Gibellina; 3,689,408 to Edmiston, et al.; and 3,585,654 to Jacobs.

One of the difficulties with prior art swimming pool cleaning hoses of the type described above and shown in the referenced patents is the necessary amount of friction generated between the rapidly moving hose and the rough sides and bottom walls of the swimming pool. Often, the abrasion on such flexible hoses causes a rapid wearing of the hoses, resulting in a short life-span for such devices. Alternatively, the action of the hose moving about the swimming pool and against the surfaces can frequently damage the finish on such pool surfaces.

In U.S. Pat. No. 3,820,172, Kane discloses the use of a plurality of wear rings surrounding the flexible hoses at strategic locations to prevent excessive hose wear. In the same manner, Rosenberg, in U.S. Pat. No. 4,005,723, illustrates a single roller on the end of a swimming pool cleaning hose for rolling the pipe in a circular action around the pool. Many of the prior art arrangements shown in the referenced patents described above further illustrate protective arrangements at the nozzle end of the hose.

SUMMARY OF THE INVENTION

The present invention contemplates a guard for swimming pool cleaning hoses and comprises a spool having a hole passing therethrough, the hole dimensioned so as to receive the hose. The arrangement is further provided with roller means, and means for rotatably supporting the roller means at the periphery of the spool, whereby said roller means reduces frictional contact between the hose and the surfaces of a pool being cleaned.

In a preferred embodiment, the spool comprises a unitary member formed of two frustro-conical sides having a concavity between the two sides and about the periphery of the spool. A plurality of roller segments formed of sections of a cylinder are rotatably mounted in the concavity about a shaft. Suitably, the spool and/or roller segments are fabricated from materials having a specific gravity less than one so that the guard may float to the surface, should it separate from the associated whip.

THE DRAWING

FIG. 1 is a perspective view, partially cut away, illustrating a swimming pool cleaning hose of the type utilized in the prior art, and shown fitted with protective guards in accordance with the present invention.

FIG. 2 is a perspective view, partially cut away, illustrating the manner in which the protective guard of the present invention is fixed to the swimming pool cleaning hose.

FIG. 3 is a cross-sectional view of one of the protective guard devices shown in FIG. 2, taken along the lines 3—3.

DETAILED DESCRIPTION

The protective guard for a swimming pool hose in accordance with the present invention will now be described with reference to FIGS. 1, 2 and 3.

With specific reference first to FIG. 1 there is shown a swimming pool 10 having a cleaning hose 12 of a conventional design, which is mounted to a canister 11 of conventional design. In accordance with the present invention, the hose 12 is provided with protective guards 14 spaced intermittently along the hose, so as to prevent unnecessary abrasive action between the side walls and bottom of the pool and the hose 12.

Reference is now made to FIGS. 2 and 3.

Each protective guard 14 includes a spool 16 formed of two frustroconical sides 18, 20 with a concavity 22 formed about the periphery of the spool 16 and between the two sides, 18, 20.

The guard 14 is further provided with a plurality of roller segments 24, each segment being formed of a cylinder having opposing beveled ends 25. Each segment includes an axial hole therethrough, into which a flexible shaft 26 extends, the shaft 26 being curved about the concavity 22 so as to hold all of the roller segments 24 within the concavity 22, (note FIG. 3).

With specific reference now to FIG. 3, it is seen that the spool 16 includes a hole 28 extending completely through the spool between the opposing frustro-conical sides 18, 20; it will be further noted that the hole 28 extends axial with each corresponding frustro-conical side 18, 20. The hole 28 includes a flare 30 beveled outwards in a direction away from the center of the spool.

Preferably, either the spool 16 or the roller segments 24 (or both) are fabricated of a high impact resistant and high abrasion resistant material having a specific gravity less than one. By way of example, the spool 16 may be fabricated from Delrin, P.V.C. or nylon, which has a low coefficient or friction and a specific gravity greater than one. The rollers 24 may be made from poly propylene or polyethylene having a specific gravity less than one.

The function of the protective guard 14 will now be described. In use, the guard 14 is slipped on to the swimming pool cleaning hose 12, with a number of the guards being preferably mounted at spaced intervals along the hose. The cleaning hose 12 is then energized causing the hose to whip about the bottom and sidewalls of the swimming pool in the manner described above. As each protective guard comes in contact with the bottom and side walls of the swimming pool 10, the roller segments 24 reduce friction between the hose and the respective side and bottom walls of the swimming pool 10, thus preventing undue abrasions to either the walls of the pool or to the hose 12. As a result, unnecessary damage is avoided. It will be noted further that the bevels 25 on the roller segments 24 further serves to provide a low friction contact between adjacent roller segments, since a sharp edge contact between adjacent roller segments is avoided.

I claim:

1. A guard for swimming pool cleaning hoses comprising:

a spool having a hole extending axially therethrough and a concavity about the periphery thereof, said hole dimensioned so as to receive said hose;

a plurality of roller segments based about said concavity and positioned therein;

means including a flexible shaft extending through all of said roller segments and about said concavity for rotatably supporting said roller means at the periphery of said spool, whereby said roller reduces frictional contact between said hose and a pool being cleaned; and wherein each roller segment comprises a cylinder with said shaft extending axially therethrough; and wherein each end of each cylindrical roller segment is beveled; and wherein said flexible shaft encircles said concavity; and wherein said hole is beveled outwardly away from the center of said spool; and wherein the specific gravity of said rollers is less than one.

2. The guard recited in claim 1 wherein said spool comprises opposing sides having an outwardly pointed frustroconical shape with said concavity therebetween.

* * * * *